(12) United States Patent
Simonenko et al.

(10) Patent No.: US 7,296,469 B2
(45) Date of Patent: *Nov. 20, 2007

(54) MAGNETOFLUIDIC ACCELEROMETER WITH ACTIVE SUSPENSION

(75) Inventors: Dmitri V. Simonenko, Potomac Falls, VA (US); Anton E. Suprun, Novosibirsk (RU); Yuri I. Romanov, Novosibirsk (RU)

(73) Assignee: Innalabs Technologies, Inc., Dulles, VA (US)

( * ) Notice: Subject to any disclaimer, the term of this patent is extended or adjusted under 35 U.S.C. 154(b) by 261 days.

This patent is subject to a terminal disclaimer.

(21) Appl. No.: 10/980,791

(22) Filed: Nov. 4, 2004

(65) Prior Publication Data

US 2006/0059990 A1    Mar. 23, 2006

Related U.S. Application Data

(63) Continuation-in-part of application No. 10/836,186, filed on May 3, 2004, now Pat. No. 6,985,134, which is a continuation of application No. 10/209,197, filed on Aug. 1, 2002, now Pat. No. 6,731,268, which is a continuation of application No. 09/511,831, filed on Feb. 24, 2000, now Pat. No. 6,466,200.

(60) Provisional application No. 60/612,227, filed on Sep. 23, 2004, provisional application No. 60/613,723, filed on Sep. 29, 2004, provisional application No. 60/614,415, filed on Sep. 30, 2004, provisional application No. 60/616,849, filed on Oct. 8, 2004.

(51) Int. Cl.
*G01P 15/00* (2006.01)

(52) U.S. Cl. .............................. 73/514.16; 73/514.17; 73/514.08

(58) Field of Classification Search ............. 73/514.08, 73/514.16, 514.17
See application file for complete search history.

(56) References Cited

U.S. PATENT DOCUMENTS 4,043,204 A * 8/1977 Hunter et al. ............ 73/514.08

(Continued)

FOREIGN PATENT DOCUMENTS

JP    62-163972    7/1987

(Continued)

OTHER PUBLICATIONS

English Translation Abstract to RU 2201618 (AL1).

(Continued)

*Primary Examiner*—Hezron Williams
*Assistant Examiner*—Samir M. Shah
(74) *Attorney, Agent, or Firm*—Bardmesser Law Group (57) ABSTRACT

A method of measuring acceleration includes suspending an inertial body using a magnetic fluid; generating a magnetic field within the magnetic fluid; modulating the magnetic field to counteract a change in position of the inertial body relative to sources of the magnetic field due to acceleration; and calculating the acceleration based on the modulation. The calculating step derives the acceleration based on an amount of current through drive coils required for the modulation. The acceleration includes linear acceleration and/or angular acceleration. The drive coils include permanent magnets, electromagnets, or a combination of a permanent magnet and an electromagnet. Sensing coils can be used for detecting the displacement of the inertial body. Each sensing coil can be positioned substantially within a corresponding drive coil. The inertial body can be non-magnetic, weakly magnetic, or have a ferromagnetic coating.

31 Claims, 9 Drawing Sheets

U.S. PATENT DOCUMENTS

| | | | |
|---|---|---|---|
| 4,047,439 A * | 9/1977 | Russell et al. | 73/514.08 |
| 4,192,189 A * | 3/1980 | Presley | 73/504.03 |
| 4,473,768 A | 9/1984 | Kerr et al. | |
| 4,601,206 A | 7/1986 | Watson | |
| 4,706,498 A | 11/1987 | Nemich et al. | |
| 4,711,125 A * | 12/1987 | Morrison | 73/178 R |
| 4,869,092 A | 9/1989 | Bernard et al. | |
| 4,922,753 A * | 5/1990 | Idogaki et al. | 73/514.08 |
| 4,984,463 A | 1/1991 | Idogaki et al. | |
| 4,991,438 A * | 2/1991 | Evans | 73/514.08 |
| 5,181,181 A | 1/1993 | Glynn | |
| 5,774,113 A | 6/1998 | Barnes | |
| 5,780,741 A * | 7/1998 | Raj | 73/514.08 |
| 5,831,553 A | 11/1998 | Lenssen et al. | |
| 5,835,077 A | 11/1998 | Dao et al. | |
| 5,908,987 A * | 6/1999 | Raj | 73/514.09 |
| 5,982,169 A | 11/1999 | Furtani et al. | |
| 6,002,184 A | 12/1999 | Delson et al. | |
| 6,128,006 A | 10/2000 | Rosenberg et al. | |
| 6,154,199 A | 11/2000 | Butler | |
| 6,369,794 B1 | 4/2002 | Sakurai et al. | |
| 6,466,200 B1 | 10/2002 | Anton et al. | |
| 6,501,458 B2 | 12/2002 | Baker et al. | |
| 6,509,888 B1 | 1/2003 | Tuovinen et al. | |
| 6,731,268 B2 | 5/2004 | Anton et al. | 345/163 |
| 2002/0003527 A1 | 1/2002 | Baker et al. | |
| 2002/0054011 A1 | 5/2002 | Bruneau et al. | |
| 2003/0063068 A1 | 4/2003 | Anton | |
| 2004/0095317 A1 | 5/2004 | Zhang et al. | |
| 2004/0140962 A1 | 7/2004 | Wang et al. | 345/179 |

FOREIGN PATENT DOCUMENTS

| | | | | |
|---|---|---|---|---|
| JP | 62 163972 A | | 7/1987 | |
| JP | 63-153472 | * | 6/1988 | 73/514.08 |
| JP | 02-205775 | | 8/1990 | |
| JP | 04-344467 | | 12/1992 | |
| JP | 04 344467 A | | 12/1992 | |
| JP | 06 213921 | | 8/1994 | |
| JP | 06-213921 | | 8/1994 | |

OTHER PUBLICATIONS

English Translation Abstract to RU 2173882 C1 (AM1).

English Translation Abstract to RU 2166203 C1 (AN1).

English Translation Abstract to RU 2168201 C1 (AO1).

"IEEE Recommended Practice for Precision Centrifuge Testing of Linear Accelerometers", IEEE Standards 836-2001, The Institute of Electrical and Electronics Engineers, Inc., Nov. 7, 2001, pp. i-86.

"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.

Bashtovoi, V.G. et al. "Introduction to Thermomechanics of Magnetic Liquids", High Temperature Institute of the Academy of Sciences of the USSR, Moscow, 1985 (partial translation of p. 13).

"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. iii-69.

English Translation Abstract for DE 3315958 A1, 1 page, supplied from the *esp@cenet* database.

Computer Internet Website, Magellan 3D Controller (also known as Space Mouse), by Logicad, a Logitech Company, address "http://www.qualixdirect.com/html/magellan.html", 2 pages.

Computer Internet Website, "Logitech 3D Mouse Logitech Head Tracker", by Fakespace, Inc., address "http://www.qualixdirect.com/html3d_mouse_and_head_tracker.html", 2 pages.

Computer Internet Website, "The Spaceball 3D Controller", by Spacetec IMC Corporation, address "http://www.qualixdirect.com/html/spaceball.html", 3 pages.

R.L.Bailey, Lesser Known Applications of Ferrofluids, Journal of Magnetism and Magnetic Materials 39:178-182 (1983).

European Search report for EP 05 25 5835, dated Feb. 2, 2006.

European Search report for EP 05 25 5837, dated Jan. 26, 2006.

* cited by examiner

MAGNETOFLUIDIC ACCELEROMETER WITH ACTIVE SUSPENSION

CROSS-REFERENCE TO RELATED APPLICATIONS

This application claims priority to U.S. Provisional Patent Application No. 60/616,849, entitled MAGNETOFLUIDIC ACCELEROMETER AND USE OF MAGNETOFLUIDICS FOR OPTICAL COMPONENT JITTER COMPENSATION, Inventors: SUPRUN et al., Filed: Oct. 8, 2004; U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., Filed: Sep. 30, 2004; U.S. Provisional Patent Application No. 60/613,723, entitled IMPROVED ACCELEROMETER USING MAGNETOFLUIDIC EFFECT, Inventors: SIMONENKO et al., Filed: Sep. 29, 2004; and U.S. Provisional Patent Application No. 60/612,227, entitled METHOD OF SUPPRESSION OF ZERO BIAS DRIFT IN ACCELERATION SENSOR, Inventor: Yuri I. ROMANOV, Filed: Sep. 23, 2004; which are all incorporated by reference herein in their entirety.

This application is a continuation-in-part of U.S. patent application Ser. No. 10/836,186, filed May 3, 2004 now U.S Pat. No. 6,985,134, which is a continuation of U.S. patent application Ser. No. 10/209,197 filed on Aug. 1, 2002 now U.S. Pat. No. 6,731,268, which is a continuation of application Ser. No. 09/511,831, filed on Feb. 24, 2000, now U.S. Patent No. 6,466,200, which claims priority to Russian patent application No. 99122838, filed Nov. 3, 1999, all of which are incorporated herein by reference in their entirety.

BACKGROUND OF THE INVENTION

1. Field of the Invention

The present invention is related to magnetofluidic acceleration sensors, and more particularly, to an acceleration sensor with a wide frequency response and a high dynamic range.

2. Background Art

Magnetofluidic accelerometers are described in, e.g., U.S. patent application Ser. No. 10/836,624, filed May 3, 2004, U.S. patent application Ser. No. 10/836,186, filed May 3, 2004, U.S. patent application Ser. No. 10/422,170, filed May 21, 2003, U.S. patent application Ser. No. 10/209,197, filed Aug. 1, 2002 (now U.S. Pat. No. 6,731,268), U.S. patent application Ser. No. 09/511,831, filed Feb. 24, 2000 (now U.S. Pat. No. 6,466,200), and Russian patent application No. 99122838, filed Nov. 3, 1999. These accelerometers utilize magnetofluidic principles and an inertial body suspended in a magnetic fluid, to measure acceleration. Such an accelerometer often includes a sensor casing (sensor housing, or "vessel"), which is filled with magnetic fluid. An inertial body ("inertial object") is suspended in the magnetic fluid. The accelerometer usually includes a number of drive coils (power coils) generating a magnetic field in the magnetic fluid, and a number of measuring coils to detect changes in the magnetic field due to relative motion of the inertial body.

When the power coils are energized and generate a magnetic field, the magnetic fluid attempts to position itself as close to the power coils as possible. This, in effect, results in suspending the inertial body in the approximate geometric center of the housing. When a force is applied to the accelerometer (or to whatever device the accelerometer is mounted on), so as to cause angular or linear acceleration, the inertial body attempts to remain in place. The inertial body therefore "presses" against the magnetic fluid, disturbing it and changing the distribution of the magnetic fields inside the magnetic fluid. This change in the magnetic field distribution is sensed by the measuring coils, and is then converted electronically to values of linear and angular acceleration. Knowing linear and angular acceleration, it is then possible, through straightforward mathematical operations, to calculate linear and angular velocity, and, if necessary, linear and angular position. Phrased another way, the accelerometer provides information about six degrees of freedom—three linear degrees of freedom (x, y, z), and three angular (or rotational) degrees of freedom ($\alpha_x$, $\alpha_y$, $\alpha_z$).

There are a number of applications where frequency response and dynamic range of the accelerometer are important. Dynamic range refers to the minimum and maximum acceleration (angular and/or linear) that the accelerometer can measure. Frequency response refers to the highest input vibration frequency that the accelerometer can measure (usually, in this context, frequency response to linear acceleration is more important than frequency response to angular acceleration, since linear vibration usually has a higher frequency than rotational vibration).

Accordingly, there is a need in the art for an accelerometer with a high dynamic range and a high frequency response.

BRIEF SUMMARY OF THE INVENTION

The present invention relates to magnetofluidic accelerometers with active suspension that substantially obviates one or more of the disadvantages of the related art.

More particularly, in an exemplary embodiment of the present invention, a method of measuring acceleration includes suspending an inertial body using a magnetic fluid; generating a magnetic field within the magnetic fluid; modulating the magnetic field to counteract a change in position of the inertial body relative to sources of the magnetic field (e.g., drive coils) due to acceleration; and calculating the acceleration based on the modulation. The calculating step derives the acceleration based on an amount of current through drive coils required for the modulation. The acceleration includes linear acceleration and/or angular acceleration. The drive coils include permanent magnets, electromagnets, or a combination of the two. Sensing coils can be used for detecting the displacement of the inertial body. Each sensing coil can be positioned substantially within a corresponding drive coil. The inertial body can be non-magnetic, or weakly magnetic (i.e., substantially less magnetic than the magnetic fluid).

In another aspect, a method for measuring acceleration includes suspending an inertial body in a magnetic fluid; measuring a position of the inertial body in response to a force applied to the inertial body; applying a counterbalancing force to the inertial body to counteract the applied force; and calculating acceleration based on the counterbalancing force.

In another aspect, an accelerometer sensor includes an inertial body, a plurality of drops of magnetic fluid holding the inertial body in suspension, and a plurality of magnetic poles maintaining the drops of the magnetic fluid in contact with the inertial body. Displacement of the inertial body is measured. A circuit modulates magnetic fields generated by the magnetic poles to counteract the displacement due to acceleration, and values of acceleration are derived therefrom.

In another aspect, a sensor includes an inertial body, a plurality of magnets located generally around the inertial body, magnetic fluid between the sources and the inertial body, and a circuit that modulates magnetic fields generated by the magnets to counteract a displacement of the inertial body due to acceleration. Acceleration can be derived based on an amount of current through the magnets required to counteract the change in position. The magnets can be located substantially inside the inertial body, or partially inside the inertial body. A ferromagnetic coating can be placed on portions of the inertial body. A housing can enclose the inertial body and the magnetic fluid. A plurality of casings can have corresponding magnets mounted therein, the casings being coupled to the housing and projecting into the housing. The sensing coils (or other position sensors) can also be mounted in the casings.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 1:
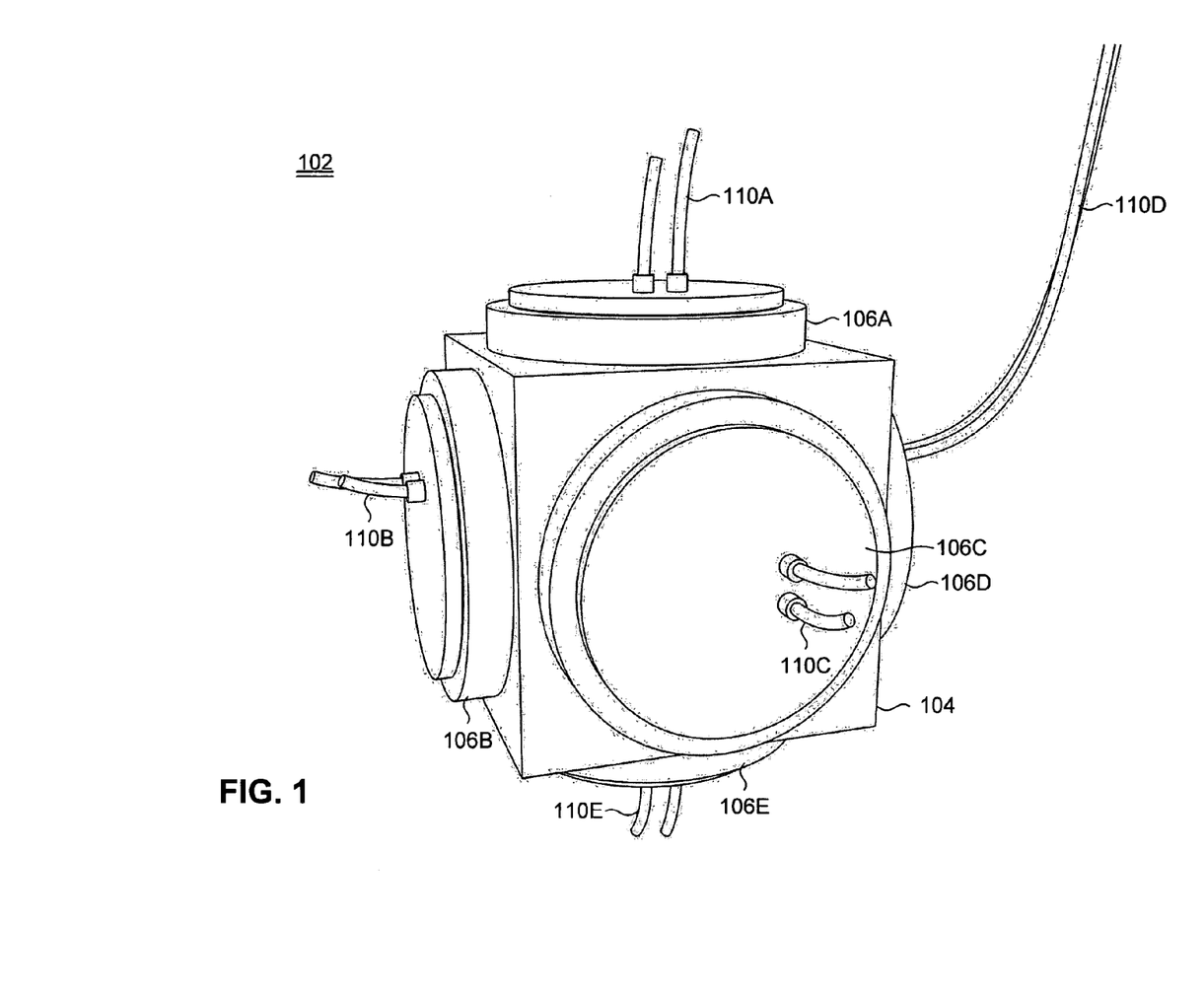
FIG. 1 illustrates an isometric three-dimensional view of an assembled magneto fluidic acceleration sensor of the present invention.

FIG. 1 illustrates an exemplary embodiment of a magnetofluidic acceleration sensor of the present invention. The general principles of operation of the magnetofluidic sensor are described in U.S. Pat. No. 6,466,200, which is incorporated herein by reference. The sensor's behavior is generally described by a set of non-linear partial differential equations, see U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., Filed: Sep. 30, 2004, to which this application claims priority.

Further with reference to FIG. 1, the accelerometer 102, shown in FIG. 1 in assembled form, includes a housing 104, a number of drive magnet assemblies 106A-106E, each of which is connected to a power source using corresponding wires 110A-110E. Note that in this view, only five drive magnet assemblies 106 are shown, but see FIG. 3, where a sixth drive magnet assembly (designated 106F) is also illustrated.

Figure 2:
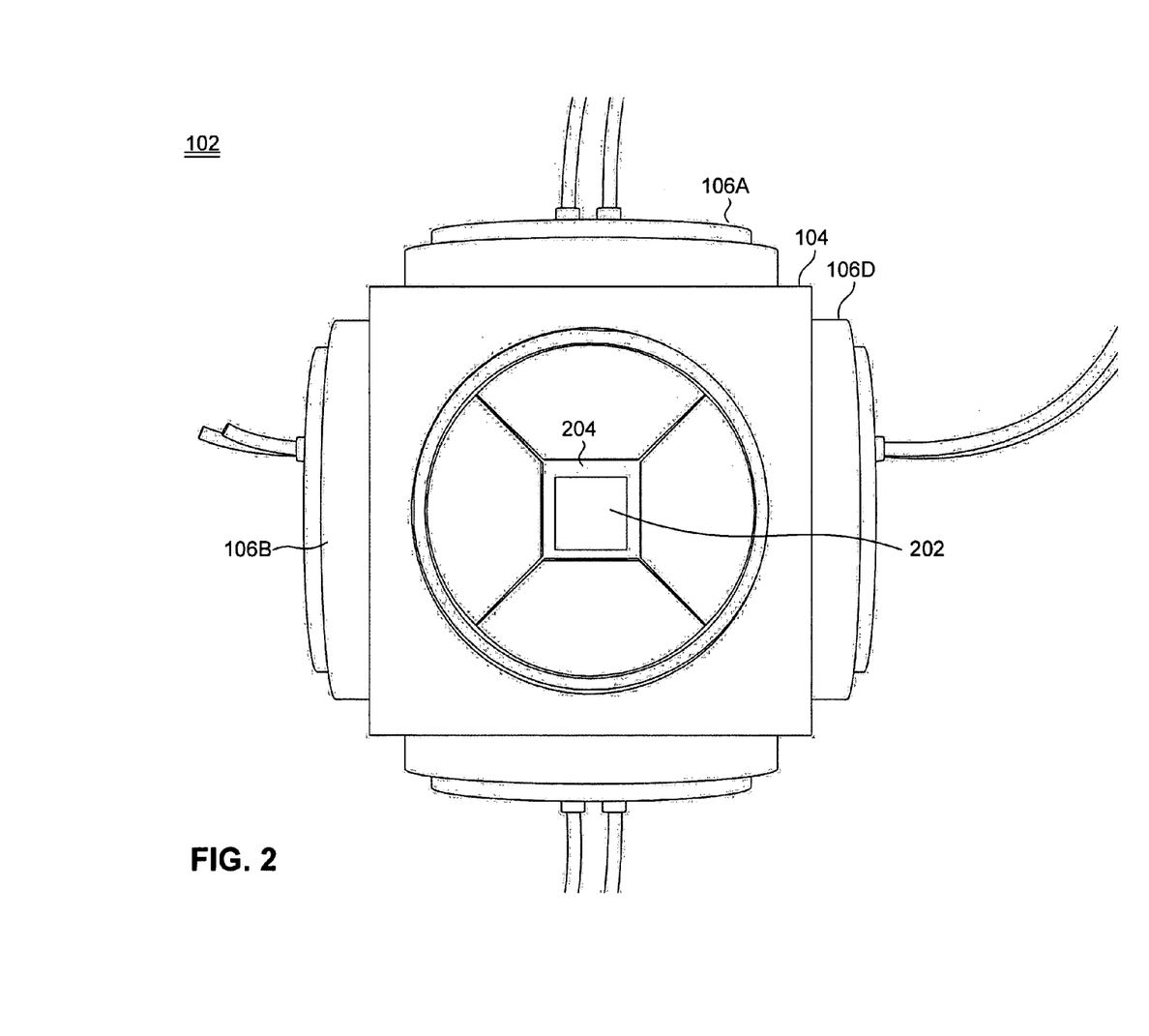
FIG. 2 illustrates a side view of the sensor with one of the drive magnet assemblies removed.

FIG. 2 illustrates the sensor 102 of FIG. 1, with one of the drive magnet assemblies removed. With the drive magnet assembly 106C removed, an inertial body 202 is visible in an approximate geometric center of the housing 104. The magnetic fluid 204 fills the remainder of the available volume within the housing. Note that the magnetic fluid itself is not actually drawn in the figure for clarity, although most such fluids are black in color and have an "oily" feel to them.

Figure 3:
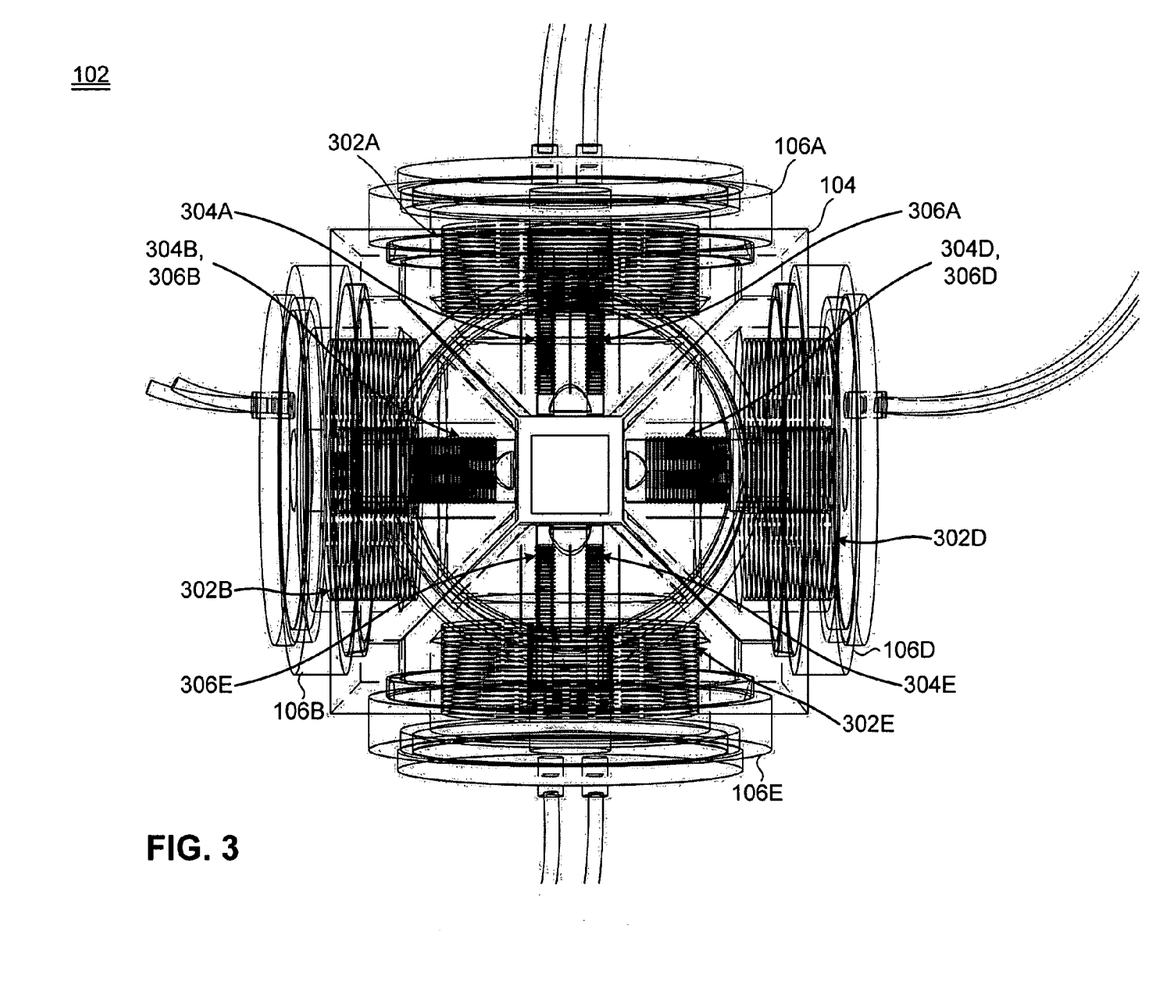
FIG. 3 illustrates a partial cutaway view showing the arrangements of the drive magnet coils and the sensing coils.

FIG. 3 illustrates a partial cutaway view showing the arrangements of the drive magnet coils and the sensing coils. Only some of the components are labeled in FIG. 3 for clarity. Shown in FIG. 3 are four drive coils (or drive magnets) 302A, 302B, 302E and 302D, collectively referred to as drive magnets 302 (the remaining two drive magnets are not shown in this figure). The drive magnets 302 are also sometimes referred to as suspension magnets, power magnets, or suspension coils (if electromagnets are used).

In one embodiment, each such drive magnet assembly 106 has two sensing coils, designated by 306 and 304 (in FIG. 3, 306A, 304A, 306B, 304B, 306E, 304E, 306E, 304E). The sensing coils 306, 304 are also sometimes referred to as "sensing magnets," or "measuring coils." Note that in addition to coils (i.e., inductive sensors), Hall sensors, laser or LED sensors, electrostatic sensors, acoustic sensors, optical sensors, capacitive sensors, etc. can also be used to detect the position of the inertial body 202.

Note further that in order to measure both linear and angular acceleration, two sensing coils per side of the "cube" are necessary. If only a single sensing coil were to be positioned in a center of each side of the "cube," measuring angular acceleration would be impossible. As a less preferred alternative, it is possible to use only one sensing coil per side of the cube, but to displace it off center. However, the mathematical analysis becomes considerably more complex in this case.

Figure 4:
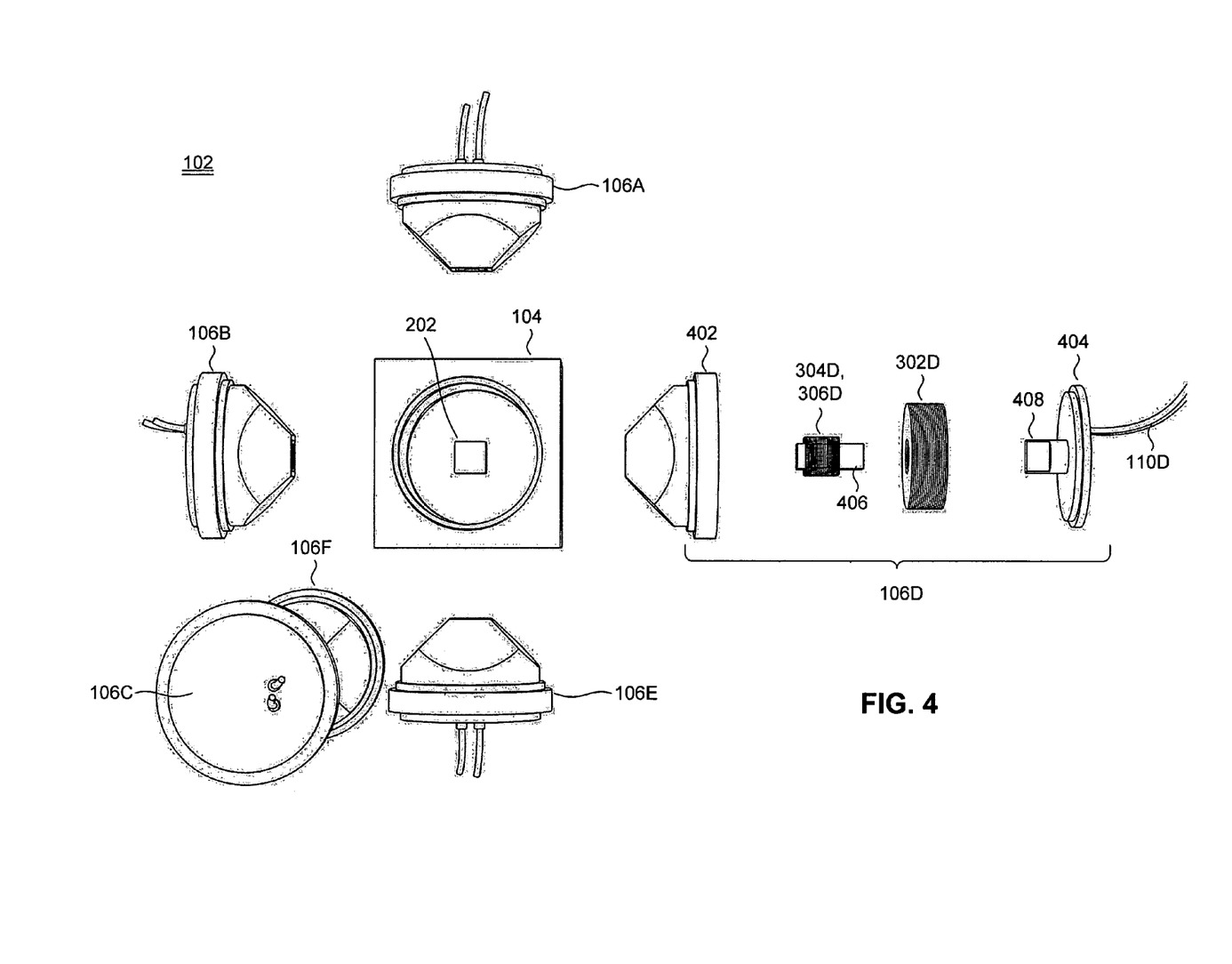
FIG. 4 illustrates an exploded side view of the sensor.
Figure 5:
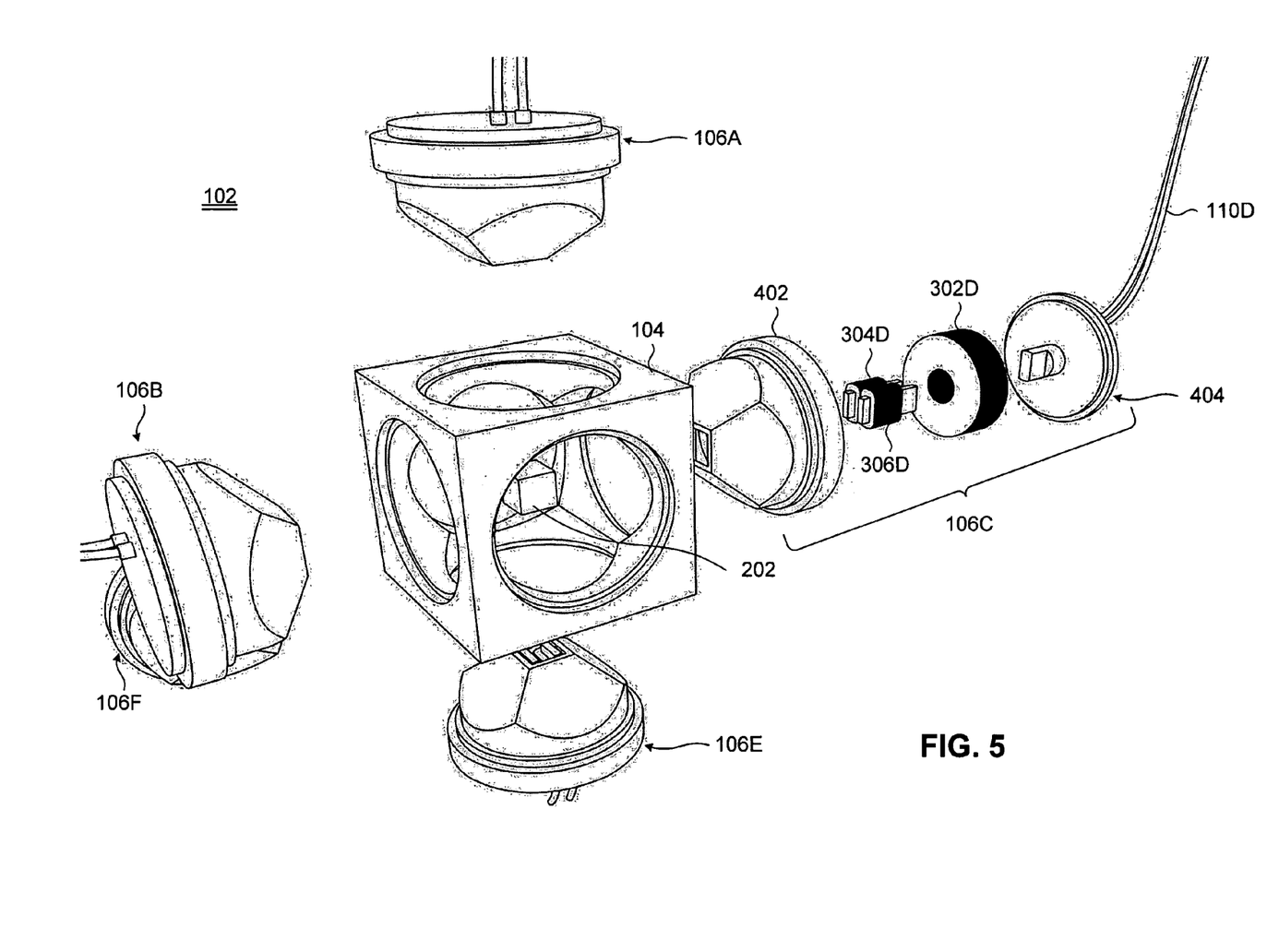
FIG. 5 illustrates a three-dimensional isometric view of the sensor of FIG. 4, but viewed from a different angle.

FIGS. 4 and 5 illustrate exploded views of the sensor 102, showing the same structure from two different angles. In particular, shown in FIGS. 4 and 5 is an exploded view of one of the drive magnet assembly 106D. As shown in the figures, the drive magnet assembly 106D includes a casing 402, a rear cap 404, the drive coil 302D, two sensing coils 306D and 304D, magnet cores 406 (one for each sensing coil 306D and 304D), and a drive magnet core 408. In an alternative embodiment, the cores 406 and 408 can be manufactured as a single common piece (in essence, as a single "transformer core").

In this embodiment, the sensing coils 306D and 304D are located inside the drive coil 302D, and the rear cap 404 holds the drive coil 302D and the sensing coils 306D and 304D in place in the drive coil assembly 106D.

The drive magnets 302 are used to keep the inertial body 202 suspended in place. The sensing coils 306, 304 measure the changes in the magnetic flux within the housing 104. The magnetic fluid 204 attempts to flow to locations where the magnetic field is strongest. This results in a repulsive force against the inertial body 202, which is usually either nonmagnetic, or partly (weakly) magnetic (e.g., substantially less magnetic than the magnetic fluid 204).

The sensor 102 described and illustrated above thus works on the principle of repulsive magnetic forces. The magnetic fluid 203 is highly magnetic, and is attracted to the drive magnets 302. Therefore, by trying to be as close to the drive magnets 302 as possible, the magnetic fluid in effect "pushes out," or repels, the inertial body 202 away from the drive magnets 302. In the case where all the drive magnets 302 are identical, or where all the drive magnets 302 exert an identical force, and the drive magnets 302 are arranged symmetrically about the inertial body 202, the inertial body 202 will tend to be in the geometric center of the housing 104. This effect may be thought of as a repulsive magnetic effect (even though, in reality, the inertial body 202 is not affected by the drive magnets 302 directly, but indirectly, through the magnetic fluid 204).

The frequency response of an accelerometer 102, such as described above, depends on many factors, such as sensor geometry, strength of the magnetic field, amount and type of magnetic fluid 204, inertial body 202 geometry and weight, and other parameters. It may be desirable to expand the dynamic range and the frequency response for certain applications, such as for applications where a vibration needs to be measured accurately. Typical dynamic range for one sensor 102, such as described in FIGS. 1-5, if the device is approximately 1-2 cubic centimeters in volume and roughly as illustrated in those figures, it is approximately a few g. Typical frequency response is usually a few tens of hertz to perhaps a few hundred hertz.

Figure 6:
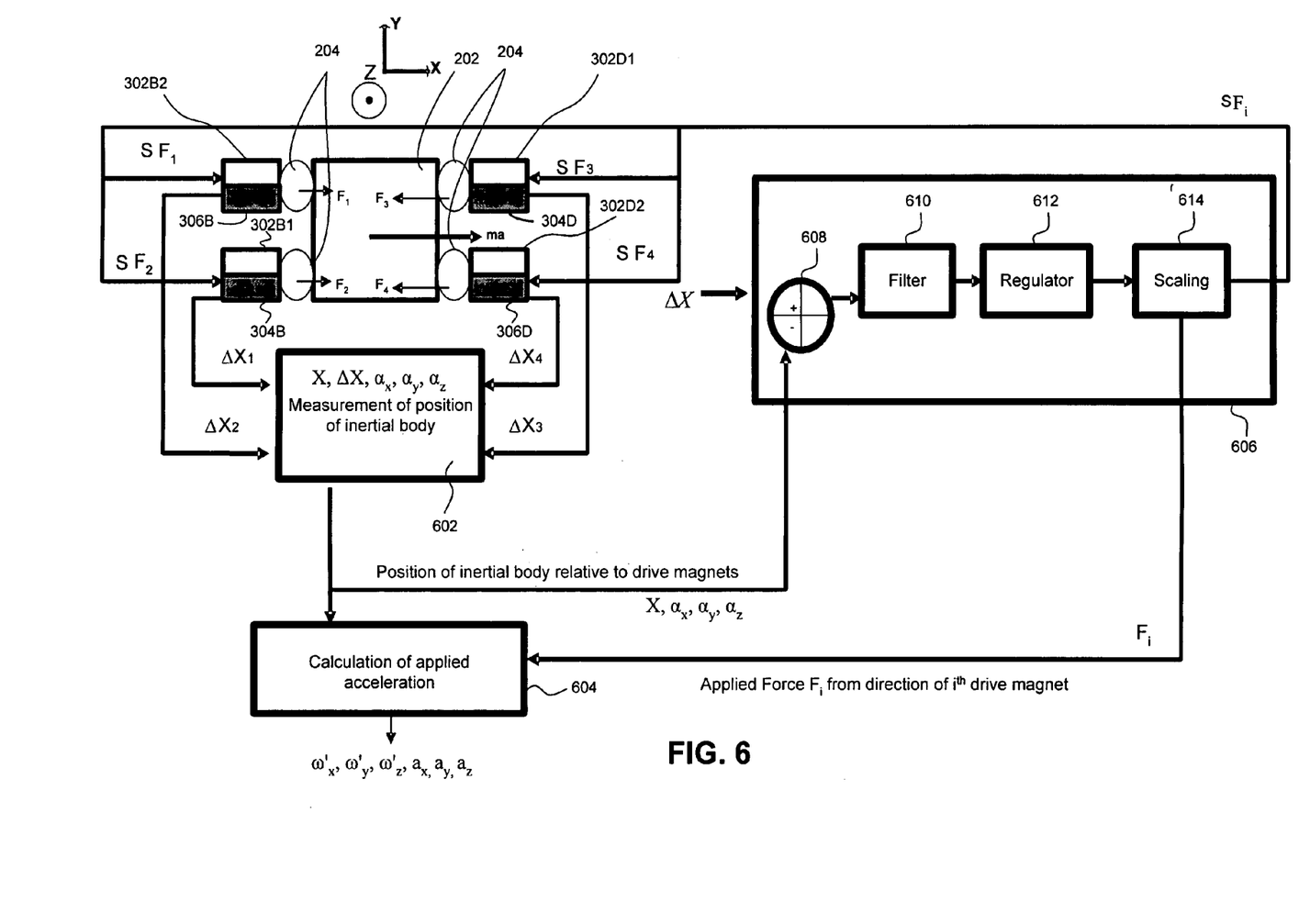
FIG. 6 illustrates an active suspension embodiment of the magneto-fluidic acceleration sensor of the present invention.

Active suspension, illustrated schematically in FIG. 6, is an alternative mechanism for generating the signal input necessary for calculating the acceleration. In active suspension, the inertial body 202 is maintained in place, while the force generated by the drive magnets 302 is controlled using a feedback loop, in order to counteract the movement of the inertial body 202. In other words, rather than allow the inertial body 202 to move relative to the housing 104 (in response to an applied force) so as to change the distribution of the magnetic flux lines within the magnetic fluid 204, the magnetic field generated by the drive magnets 302 is controlled, using a feedback loop. The amount of current necessary to maintain the inertial body 202 in place is the variable that is actually measured, and from that current, linear and/or angular acceleration is derived.

FIG. 6 illustrates one embodiment of active suspension in a magneto-fluidic accelerometer. For illustration purposes, the "sides" of the cube have been labeled consistently with the labeling in FIGS. 1-5 (i.e., A, B, D, E). Only the elements used on sides B and D are shown in FIG. 6, although it will be understood that each side of the "cube" usually has a similar arrangement.

Shown in FIG. 6 is an inertial body 202 which is in contact with magnetic fluid 204. Four drive magnets, labeled 302D1, 302D2, 302B1, 302B2 are shown in FIG. 6, although it will be understood that, in this case, each side of the "cube" has two such drive magnets 302, for a total (in this case) of 12 drive magnets 302 for the entire accelerometer 102. In an alternative embodiment, it is possible to use only a single drive magnet 302 per side of the "cube," as illustrated in FIGS. 1-5.

Also shown in FIG. 6 are four sensing coils 306B, 304B, 306D, 304B. For simplicity, the sensor housing 104 is not illustrated in FIG. 6. Also, the magnetic fluid 204 is shown in FIG. 6 as discrete droplets, in other words, incompletely filling the volume inside the housing 104. In an alternative embodiment, the entire available volume in the housing 104 is filled with the magnetic fluid 204.

Further shown in FIG. 6 is a circuit 602 for measuring the position vector X of the inertial body 202. The coordinate vector X is derived from the output of the sensing coils 306B, 304B, 306D, 304B. A change in the coordinate vector X relative to where the inertial body 202 is located before the force F applied to the accelerometer is designated by $\Delta X$. $\omega$ is the angular velocity, therefore, $\omega'$ is the angular acceleration (a first derivative of angular velocity $\omega$), with its individual components about the relevant axis represented as $\omega'_x$, $\omega'_y$, $\omega'_z$. $a_x$, $a_y$, $a_z$ are the linear acceleration components along the relevant axes, $\alpha$ is the set of angles of rotation of the inertial body 202 around the relevant axis ($\alpha_x$, $\alpha_y$, $\alpha_z$) and $\Delta X_i$ is the change in the distance between the inertial body 202 and the $i^{th}$ sensing coil. The subscript "i" refers to the drive magnets, in other words, top left (302B2) labeled by the subscript 1, top right (302D1) designated by the subscript 3, etc.

The droplets of the magnetic fluid 204 exert forces $F_i$ on the inertial body 202. A force F (directed towards the right of FIG. 6) is applied to the inertial body 202 (causing acceleration, which results in the forces $F_1$ and $F_2$ being weaker than the forces $F_3$ and $F_4$, as shown in the figure).

A circuit 604 is used to calculate the applied acceleration, both linear ($a_x$, $a_y$, $a_z$) and angular ($\omega'_x$, $\omega'_y$, $\omega'_z$). The input to the circuit 604 is the measurement of the position of the inertial body 202 (using the sensing coils 306B, 304B, 306D, 304B) from the circuit 602 and the amount of force $F_i$ for each drive magnet 302 required to be applied by each drive magnet 302 to the inertial body 202, so as to maintain the inertial body in place. A controller 606 runs in a feedback loop, calculating the amount of force $F_i$ needed to be applied to the drive magnets 302. Inputs to the controller 606 are the coordinate vector X of the inertial body 202 and the displacement $\Delta X$ relative to the drive magnets 302, as shown in FIG. 6.

A summer 608 is used to combine the values of X, $\alpha$ and $\Delta X$, so as to enable calculation of the displacement of the inertial body 202. A filter 610 can be used to reduce unwanted effects from zero bias and zero bias drift, and to filter out any unwanted high frequency components, if desired. An example of such a filter is described in U.S. Provisional Patent Application No. 60/612,227, entitled METHOD OF SUPPRESSION OF ZERO BIAS DRIFT IN ACCELERATION SENSOR, Inventor: Yuri I. ROMANOV, Filed: Sep. 23, 2004, which is incorporated herein by reference in its entirety. A regulator 612 is used to form a signal for control of the suspension of the inertial body 202, given the static and dynamic characteristics of the sensor 102, so as to maintain $\Delta X$ at a constant value. To the extent that the sensor 102 is treated as being described by a set of non-linear partial differential equations (see U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, which is incorporated herein by reference in its entirety), then a regulator 612 can be chosen that best fits the chosen model (usually, some approximation of a solution of the non-linear partial differential equations, which do not have a closed form solution and must be solved numerically). The acceleration components $\omega'_x$, $\omega'_y$, $\omega'_z$, $a_x$, $a_y$, $a_z$ can then be calculated.

A scaling circuit 614 is used to provide a set of scaling factors S for each $F_i$ corresponding to each drive magnet 302. The scaling circuit 614, in the simplest case, is essentially an amplifier (or a set of amplifiers) that converts the output of the regulator 612 to the necessary currents by using a set of scaling parameters S. A more complex scaler can also be used. The output of the active suspension controller 606 is used to control the current flowing through the drive magnets 302, which in turn controls the magnetic fields, which in turn force the inertial body 202 to remain in place. The controller 606 can be implemented as a hybrid analog-digital circuit, or as a microprocessor with A/D and D/A inputs/outputs and a driver circuit for the magnets 302, or in any other manner as would be apparent to one skilled in the art.

Note that knowing the acceleration components $\omega'_x$, $\omega'_y$, $\omega'_x$, $a_x$, $a_y$, $a_z$, linear and angular velocities can also be calculated in a straightforward manner (using integration), as well as linear and angular position (using one more integration).

Thus, an active feedback loop ("active suspension") is implemented, so as to force the inertial body 202 to remain virtually stationary. The drive magnets 302 exert forces on the inertial body 202 to counteract the applied force. Based on the amount of force (and therefore current) necessary to maintain the inertial body 202 in place, linear and angular accelerations can then be calculated.

Phrased another way, the acceleration can be derived from the amount of "effort" needed to maintain the inertial body 202 in place. The "effort" is related to the current needed to generate the required magnetic field. Thus, the acceleration is related to the current needed to maintain the inertial body 202 in place. The inertial body 202 itself essentially remains nearly motionless. This is the principle behind active suspension.

Figure 7:
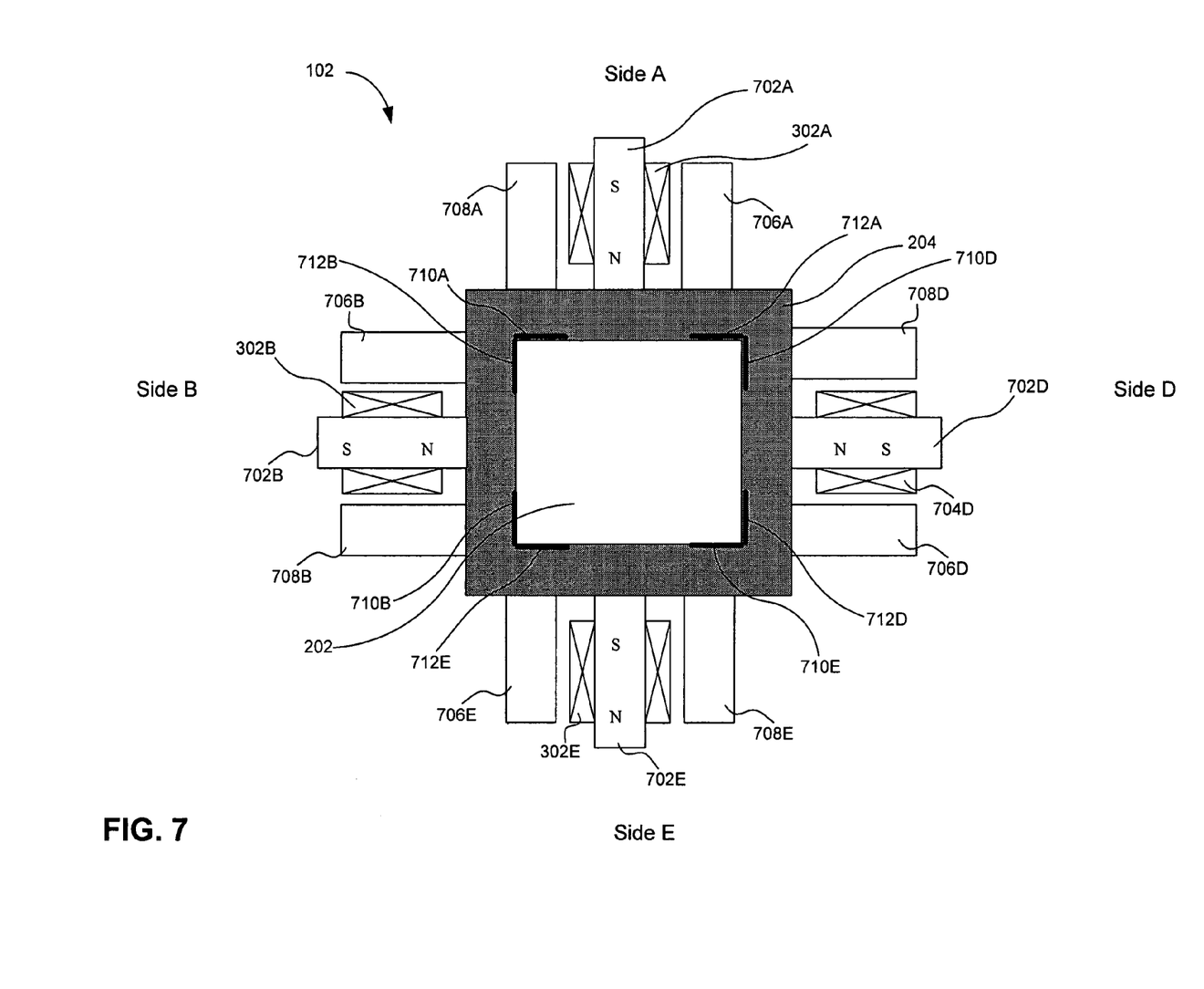
FIG. 7 illustrates how ferromagnetic coatings can be used for active suspension.

FIG. 7 illustrates another alternative embodiment of how active suspension can be implemented. Shown in FIG. 7 is the inertial body 202 surrounded by magnetic fluid 204. (The housing 104 is not shown in this figure.) Each single drive magnet 302 includes a coil winding, labeled 302A, 302B, 302E, 302D (similar to what is shown in FIG. 3, with the letters corresponding to the letters of FIGS. 1-5) and a permanent magnet 702 (four are shown in FIG. 7, labeled 702A, 702B, 702C, 702D), and an electromagnet 704. The inertial body 202 includes ferromagnetic magnetic coating, selectively applied in various locations, designated by 710A, 710B, 710C, 710D and 712A, 712B, 712C, 712D. Position sensors 706A, 706B, 706C, 706D and 708A, 708B, 708C, 708D, corresponding to the ferromagnetic coatings 710A, 710B, 710C, 710D and 712A, 712B, 712C, 712D, are used to measure position of the inertial body 202. The position sensors 706A, 706B, 706C, 706D and 708A, 708B, 708C, 708D can be, for example, Hall sensors or inductive sensors.

Figure 8:
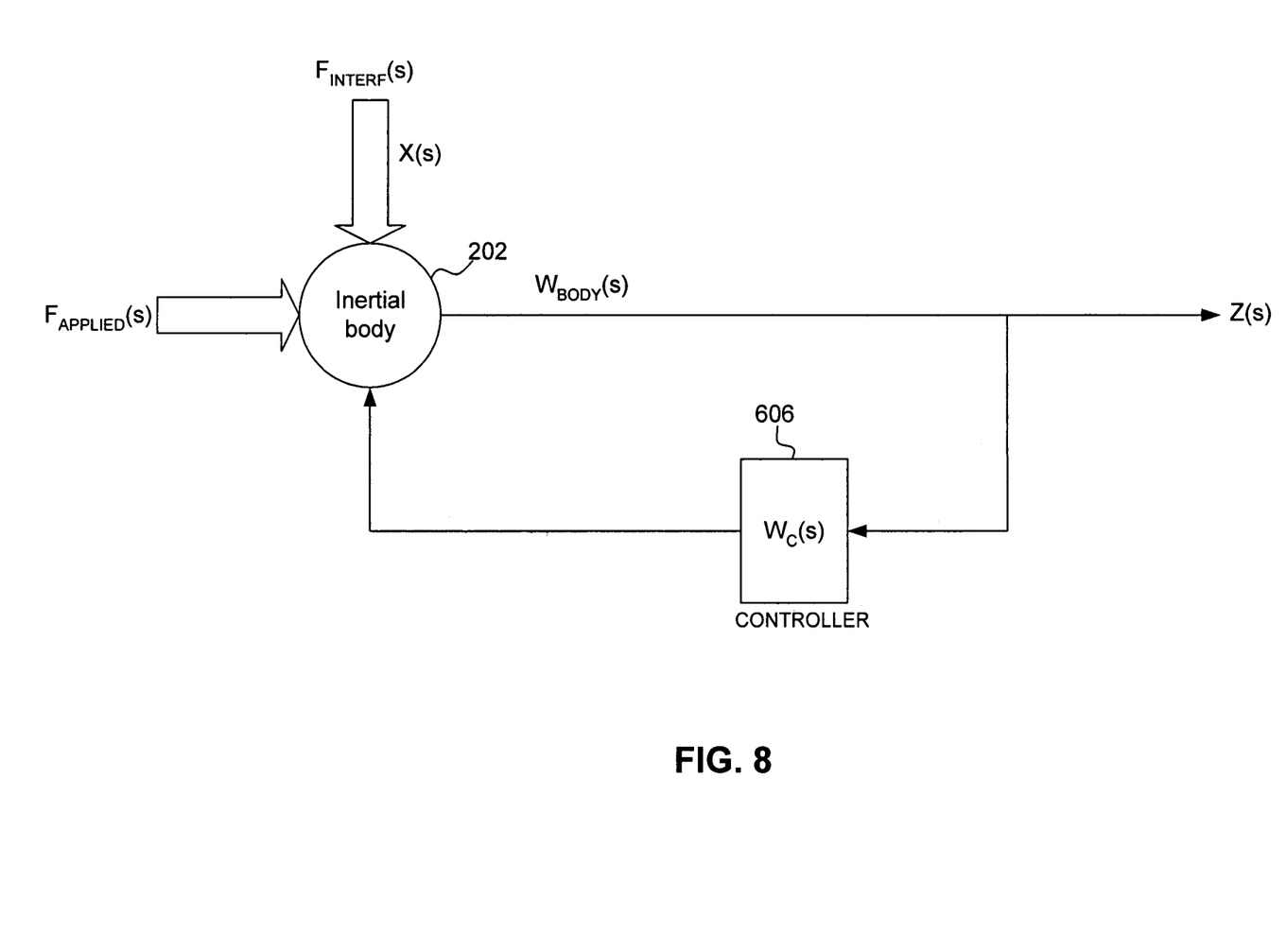
FIG. 8 illustrates active suspension in more mathematical form.

FIG. 8 illustrates active suspension in more mathematical form. Consider the following functional analysis of the how active suspension applies to the sensor 102. The following designations will be used:

$F_{APPLIED}(S)$—a Laplace transform of an applied force $f_{APPLIED}(t)$, defined by $$L\{f_{APPLIED}(t)\} \equiv F_{APPLIED}(s) \equiv \int_0^\infty e^{-st} f_{APPLIED}(t) dt$$

($f_{APPLIED}(t)$ reflects the inertia caused by the acceleration of the sensor 102);

$F_{INTERF}(s)$—a Laplace transform of a force $f_{INTERF}(t)$ that represents various interference factors (e.g., due to noise, construction defects, imperfections, magnetic fluid inhomogeneities, etc., as they affect the movement of the inertial body 202);

$Z(s)$—a Laplace transform of an output signal $z(t)$;

$X(s)$—a Laplace transform of an error signal $x(t)$ due to the non-ideal nature of the sensor 102;

$W_{BODY}(S)$— transfer function of the inertial body 202; and $W_C(s)$—transfer function of the controller 606.

The purpose of active suspension is to ensure that the time dependence of the output signal $z(t)$ corresponded to the time dependence of the applied force $f_{APPLIED}(t)$ (the force due to inertia caused by the acceleration of the sensor 102), and, at the same time, has a minimal correspondence to time dependence of the force $f_{INTERF}(t)$ (representing the various interference factors, imperfections, non-linearities and noises). The equation for the output signal Laplace transform $Z(s)$ is a product of the individual transfer functions of each element, and can be written as follows:

$$Z(s) = K_{APPLIED}(s)F_{APPLIED}(s) + K_{INTERF}(s)F_{INTERF}(s) \quad \text{Equation (1)}$$

Where $$K_{APPLIED}(s) = \frac{W_C(s)W_{BODY}(s)}{1 + W_C(s)W_{BODY}(s)} \quad \text{Equation (2)}$$

is the transfer function of the applied force (inertial force) $f_{APPLIED}(t)$. $K_{INTERF}(S)$ is the transfer function of the interfering force $f_{INTERF}(t)$ (force due to noise, etc.) and is defined by $$-K_{INTERF}(s) = \frac{W_{BODY}(s)}{1 + W_C(s)W_{BODY}(s)} \quad \text{Equation (3)}$$

The error $X(s)$ is therefore given by:

$$X(s) = F_{APPLIED}(s) - Z(s) \quad \text{Equation (4)}$$

Substituting equation (1) into equation (4), the error $X(s)$ can be represented as follows:

$$X(s) = (1 - K_{APPLIED}(s))F_{APPLIED}(s) - K_{INTERF}(s)F_{INTERF}(s) \quad \text{Equation (5)}$$

The transfer function for $F_{APPLIED}(s)$ is therefore given by:

$$1 - K_{APPLIED}(s) = \frac{1}{1 + W_C(s)W_{BODY}(s)} \quad \text{Equation (6)}$$

The transfer function for $X(s)$, given the applied force $f_{APPLIED}(t)$, is given by:

$$-K_{INTERF}(s) = \frac{-W_{BODY}(s)}{1 + W_C(s)W_{BODY}(s)} \quad \text{Equation (7)}$$

The degree of influence of $F_{APPLIED}(s)$ and $F_{INTERF}(s)$ on $Z(s)$ (or on $X(s)$) is defined by the corresponding transfer function. To reduce the influence of the interfering forces on the output signal $z(t)$ and on the error signal $x(t)$, the transfer function $K_{INTERF}(S)$ should be minimized. To ensure that the output signal z(t) reflects the applied acceleration $f_{APPLIED}(t)$ most accurately, $K_{APPLIED}(S)$ should be as close to 1 as possible.

Such transfer functions $K_{INTERF}(S)$ and $K_{APPLIED}(S)$ can be achieved by varying the parameters of the controller 606, in other words, by changing the transfer function $W_C(s)$ of the controller 606, i.e., changing parameters of the various elements of the controller 606. It follows from equations (2) and (3) that as $W_C(s)$ increases, the transfer function $K_{INTERF}(s)$ will decrease, asymptotically approaching zero, while the transfer function $K_{APPLIED}(s)$ will asymptotically approach 1. Therefore, in the limit, $$1-K_{APPLIED}(s)=0, K_{INTERF}(s)=0 \qquad \text{Equation (8)}$$

Equation (8) means that the transfer function of the error due to both the applied force and the interfering force is zero for all values. If equation 8 is substituted into equations (2) and (5), it follows that the Z(s) is equal to the Laplace transform of the applied force, or $Z(s)=F_{APPLIED}(s)$, and the contribution of the error to the useful signal is zero, or $X(s)=0$, which corresponds to an ideal system with zero error. In other words, in such a system, the output signal z(t) will be determined solely by the applied force $f_{APPLIED}(t)$ (in this case, due to inertia of the inertial body 202), and will not depend on the imperfections, noise, magnetic fluid instabilities and other non-idealities of the sensor 102.

In practice, achieving infinitely large values for such coefficients is impossible, therefore, there will be some error present, however, such error will be considerably less than a corresponding error in a sensor without active suspension. Thus, the use of active suspension permits improving stability of sensor parameters and reducing the effect of sensor non-linearities.

Figure 9:
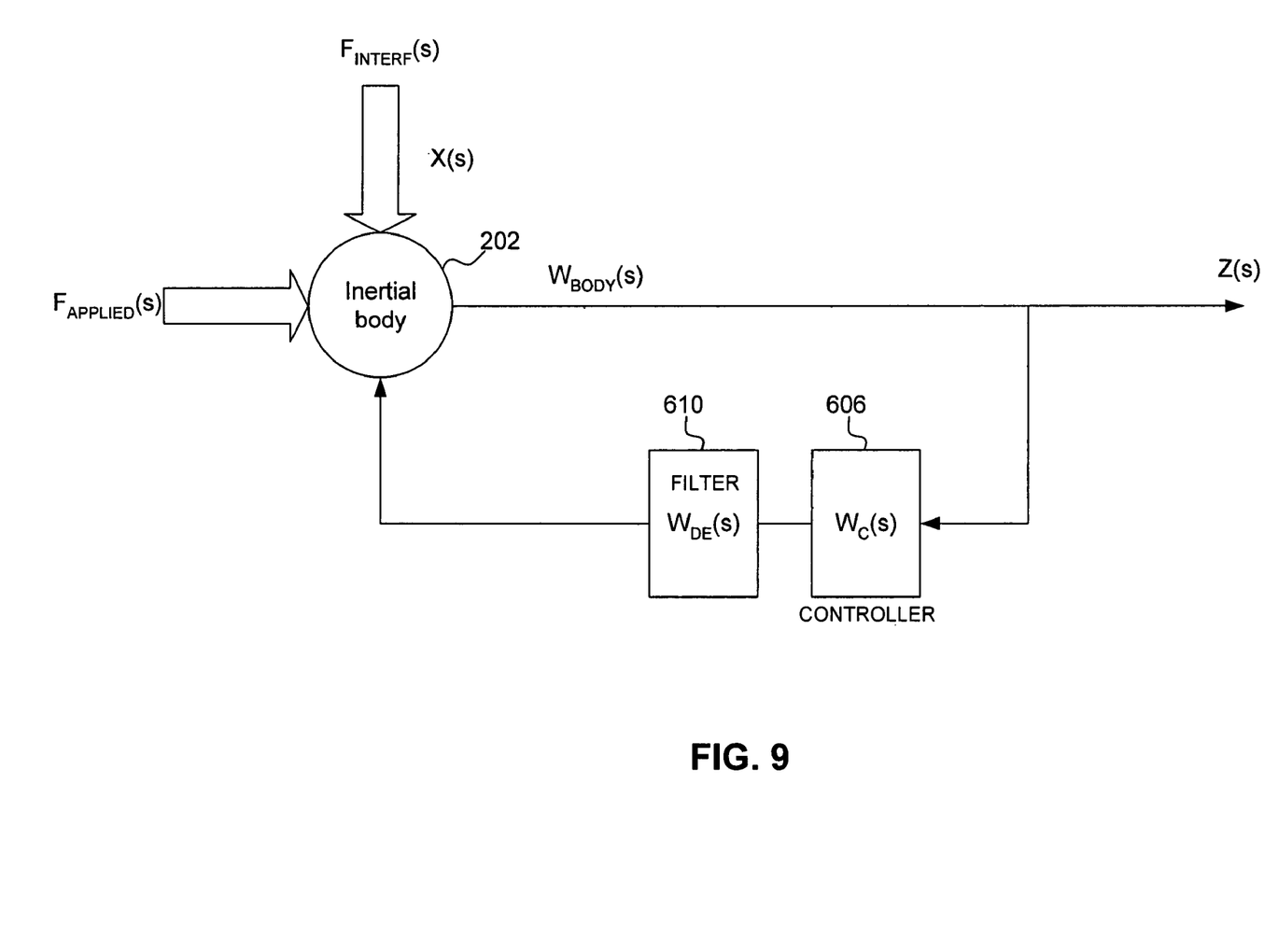
FIG. 9 shows how active suspension can be used to derive velocities (linear and angular) from acceleration.

FIG. 9 shows how active suspension can be used to derive velocities (linear and angular) from acceleration. The feedback loop includes a differential element (such as a filter 610), with a transfer function $W_{DE}(S)=p$. Analogous to the discussion above, the Laplace transform Z(s) of the output signal z(t) can be represented by $$Z(s) = \frac{F_{APPLIED}(s)}{W_{DE}(s)} \qquad \text{Equation (9)}$$

given that the controller 606 has an amplification factor of K>>1. Equation (9) corresponds to the transfer function for an integrator, therefore, the output signal z(t) will change based on integration of the input signal (i.e., of the applied force $f_{APPLIED}(t)$ due to sensor acceleration). The integration of the applied force $f_{APPLIED}(t)$ over time will therefore correspond to values of linear and angular acceleration.

An advantage of using active suspension is that frequency response and dynamic range of the sensor 202 is significantly improved. This is due to the fact that the magnetic flux lines within the magnetic fluid 204 are only minimally disturbed. Since the actual movement of the inertial body 202 is minimal (compared to the movement of the inertial body 202 without active suspension), the frequency response of the sensor 102 improves. Also, the likelihood of the magnetic flux lines becoming "jumbled up" due to inertial body 202 motion is reduced, since the dipoles in the magnetic fluid 204 do not lose their orientation due to the movement of the inertial body 202, but are only shifted slightly, and then shift back into their normal position. In other words, the distribution of the magnetic flux lines within the magnetic fluid 204 does not change substantially. Only the magnetic flux density increases or decreases, under active feedback control.

Consequently, the stability of the sensor 102 is improved, because the magnetic fluid 204 is disturbed only minimally, and the distribution of magnetic flux lines within the magnetic fluid 204 is forced to stay relatively constant. Note that a designer needs to be concerned with the maximum amount of magnetic flux per unit area that a given material (in this case, the magnetic fluid 204) can carry. This also serves as one of the limits on the maximum acceleration that the sensor 102 can measure. It should also be noted that once the magnetic flux density in the magnetic fluid 204 reaches saturation (when active suspension is used), and if the acceleration experienced by the sensor 102 is high enough that the inertial body 202 cannot be maintained in position, there is still the possibility of the sensor 102 functioning, even though the inertial body 202 disturbs the magnetic fluid 204 (in other words, partly defaulting to the case of inactive suspension). However, this obviously has limits, since at some (high enough) acceleration, the inertial body 202 will simply hit the inside wall of the housing 104 or one of the drive magnet assemblies 106. Nonetheless, as noted above, the stability of the sensor 102 is improved, since the magnetic fluid 204 is left essentially undisturbed over a much wider range of accelerations.

Another advantage of active suspension is that because the inertial body 202 stays in the center of the housing 104, the effects of linear acceleration and angular acceleration on the inertial body 202 are independent of each other, allowing for more accurate measurement of both quantities. In other words, if the inertial body 202 (in the absence of active suspension) is displaced from the geometric center of the housing 104 and, in addition, is subject to angular acceleration, Coriolis forces act on the inertial body 202. The Coriolis forces are perceived as linear acceleration. This introduces cross-dependence of the linear and angular accelerations on each other, which is undesirable. Active suspension addresses this problem.

The dynamic range is improved because the amount of magnetic force normally required to maintain the inertial body 202 at the center of the housing 104 is less than it otherwise would be. It will be apparent to one skilled in the relevant art that if no active suspension were used, it is necessary to prevent the inertial body 202 from striking the housing 104 wall, at a linear acceleration up to some specified value. With active suspension, the amount of magnetic force normally generated by the drive magnets 302 (whether permanent or electromagnets or both), when no acceleration is experienced needs to be less.

Active suspension can also be used to reduce or eliminate any environmental effects due to stray magnetic fields, provided the stray magnetic fields are either known or measured in real time. Additionally, the sensor 102 can be shielded and/or the housing 104 can be coated with a ferromagnetic coating on the outside, to address such environmental effects.

Active suspension allows for a much greater interchangeability of the sensors between various applications. For example, a sensor without active suspension, designed for use by a human, may only need to withstand up to 2 g of acceleration. On the other hand, a sensor designed for use on aircraft, or for some military applications, may need to be able to withstand an acceleration up to 50 g. With active suspension, the same basic sensor design can be used across a much wider spectrum of applications. It should be noted that such a change of application requires only a change in the control electronics, and can be accomplished, for example, using software.

The sensor 102 essentially acts as a low-pass filter for vibration. This is due primarily to the damping effect of the magnetic fluid 204 in which the inertial body 202 is immersed, and due to the interaction between the inertial body 202, the magnetic flux lines within the magnetic fluid 204, and the drive magnets 302. The exact frequency response depends heavily on the design details and the geometry of the sensor 102 itself. Also, the frequency response depends on the particular fluid used as the magnetic fluid 204, the magnetic flux densities in the fluid, the density of the dipoles in the magnetic fluid 204, whether or not active suspension is used, the weight and geometry of the inertial body 202, etc. In some applications, it may be desirable to filter out high frequencies. Also, the less the inertial body 202 needs to move for a given applied acceleration, the higher the bandwidth. In other words, a sensor can be configured to measure high frequency components of linear and/or angular acceleration for certain applications.

For example, in automotive applications, it may be desirable to reject (i.e., filter out) engine vibrations of a car, and only measure actual changes in the car's linear and/or angular acceleration. In other applications, measurement of high frequency components of linear and/or angular acceleration may be necessary, and a designer will readily appreciate that the sensor's form factor needs to be matched to the particular application.

The sensor 102 can use either electromagnets or permanent magnets, as the drive magnets 302, or a combination of the two. The use of permanent magnets as drive magnets 302 can substantially reduce the power consumption. For example, the amount of current consumed by electrical magnets can be in the tens of milliamps (although the number is heavily dependent on the geometric form factor, the mass of the inertial body 202, the size of the housing 104, and numerous other parameters, and may be much less in some implementations). With the use of permanent magnets, the amount of current drawn by the sensor 102 is minimal, and is primarily due to the control electronics.

However, it should be noted that with the use of only permanent magnets, active suspension is relatively difficult to achieve, since permanent magnets do not permit for feedback control of the inertial body 202. One solution to this can be the use of a combination of two magnets for use as a drive magnet 302, a permanent magnet, and an electromagnet. The permanent magnet is used to maintain the position of the inertial body 202 in the absence of external input, and the electromagnet is used for active suspension. In other words, the magnetic force acting on the inertial body 202 is a combination of magnetic forces generated by the permanent magnet and by the electromagnet.

In the case of using a combination of a permanent magnet and an electromagnet as the drive magnet 302, the ratio of magnetic force due to each of the magnets may be, for example, 80/20 or 70/30 (permanent/electromagnet). In other words, in this case, the inertial body 202 is suspended primarily by the force of the permanent magnet, with the electromagnet providing only auxiliary force when turned on. In other cases, a reverse ratio, e.g., 20/80 or 30/70, may be used. Note that this ensures that even with the electromagnets turned off, and the housing 104 being only partially filled with the magnetic fluid 204, the magnetic fluid 204 will remain near the magnets, even when the sensor 102 is completely turned off.

Thus, the advantages of using a combination of permanent magnets and electromagnets as the drive magnets are as follows:

The amount of current used, particularly during "passive" periods, is reduced. It is possible to reduce the amount of required current if the sensor is only used during brief periods of time. During those brief periods, the electromagnets are turned on and then shut them off when the measurement is completed.

Using the active control system and the electromagnets, it is possible to regulate the suspension characteristics of the inertial body 202 dynamically and control any instabilities of the inertial body 202 suspension that may arise due to time-dependence of the properties of the magnetic fluid 204 and the drive magnets 302. It is also possible to stabilize the properties of the magnetic fluid 204 by intensively mixing and agitating it ("stirring it"), to force a movement of the inertial body 202. This can be either done automatically (periodically, or, for example, when no acceleration has been detected for some long period of time), or in response to a user command.

The use of a permanent magnet allows a reduction in magneto-diffusive properties of the magnetic fluid 204, and therefore, a corresponding effect on the suspension of the inertial body 202. The use of a permanent magnet allows the realization of the partial filling of the housing 104 with the fluid, which in turn permits better dynamic characteristics of the sensor and greater stability of the inertial body 102 suspension due to reduction in a volume of the magnetic fluid 204 that is not used in the actual suspension of the inertial body 202.

Selection of the magnetic fluid 204 can be a consideration. Generally, it may be desirable for the magnetic fluid 204 to have the following characteristics: minimum viscosity, maximum flux density before saturation, uniform size of the dipoles, no impurities, stability of its properties over time, stability of its properties over as wide a range of temperatures as possible, non-corrosivity, low coefficient of expansion, and, for applications where optical sensing of the movement of the inertial body 202 is used, optical transparency. As will be appreciated, many of these properties are difficult to achieve in combination. Therefore, the designer needs to carefully select the appropriate magnetic fluid 204 depending on the particular application and the desired sensor performance.

One example of the magnetic fluid 204 is kerosene with suspended iron oxide ($Fe_3O_4$) particles. The magnetic fluid 204 is therefore a colloidal suspension. Typical diameter of the $Fe_3O_4$ particles is on the order of 10-20 nanometers (or smaller). The $Fe_3O_4$ particles are generally spherical in shape, and act as the magnetic dipoles when the magnetic field is applied.

More generally, the magnetic fluid 204 can use other ferromagnetic metals, such as cobalt, gadolinium, nickel, dysprosium and iron, their oxides, e.g., $Fe_3O_4$, $FeO_2$, $Fe_2O_3$, as well as such magnetic compounds as manganese zinc ferrite ($Zn_xMn_{1-x}Fe_2O_4$), cobalt ferrites, or other ferromagnetic alloys, oxides and ferrites. Also, water or oil can be used as the base liquid, in addition to kerosene.

In another embodiment, the magnetic fluid 204 may be a two-phase system that possesses both flowability and high sensitivity to an applied magnetic field. The particle size of the solid phase of the mixture in one embodiment may be on the order of $1\times10^{-9}$ meters, up to a few tens of nanometers. One type of suitable magnetic fluid 204 is a low viscosity dispersion of magnetite or loadstone in kerosene, having a density between about 1.1 and about 1.5 grams/cubic centimeter. The kerosene dispersion has an effective viscosity between about 0.005 and about 0.1 PAs and has a magnetizability under a 250 kA/m magnetic field between about 30 and about 50 kA/m. Another suitable magnetic fluid 204 is a low viscosity dispersion of magnetite in liquid organic silicone having a density between about 1.1 and about 1.5 grams/cubic centimeter. The silicon dispersion has an effective viscosity below about 0.7 PAs and has a magnetizability under a 250 kA/m magnetic field of about 25 kA/m. Further, a magnetoreactic suspension of dispersed ferromagnetic matter in liquid organic silicone may serve as a suitable magnetic fluid 204. The magnetoreactic suspension has a density between about 3.4 and about 4.0 grams/cubic centimeters, a friction factor of about 0.1 to about 0.2, and a wear rate between about $2 \times 10^{-7}$ and about $8 \times 10^{-7}$.

When a magnetic field is applied to the magnetic fluid 204, behaves somewhat as an elastic solid body, which resists deformation when the inertial body 202 "pushes" against it. In other words, it behaves somewhat in a manner of an object with elastic deformation, with a quasi-crystalline structure. This effect may need to be taken into account in some applications.

The present invention has numerous applications. For example, it is applicable to man-machine interfaces that require measurement of motion. It is applicable to active devices that respond to sudden acceleration/deceleration. It is applicable to measurement devices that monitor/adjust constant speed motion, and to monitoring systems that measure and control vibrations in linear or rotational motion. It is applicable to exact positioning for law-enforcement authorities and rescue services personnel, precise positioning and orientation for medical services and emergency vehicles. It is applicable to precise personal navigation tools for travelers. It is applicable to gaming (controllers, manipulators, Virtual Reality). It is applicable to sports, such as training programs, team games and individual games. It is applicable to the entertainment field, such as motion capture. It is applicable to computer input devices (e.g., 3-dimensional computer mice), and 3D CAD Measurement Devices.

Aerospace applications include, e.g., control and inertial navigation of lightweight unmanned aerial vehicles (UAV). Land vehicle applications include vehicle dynamics analysis and dead-reckoning of (D)GPS information of vehicles. Marine industry applications include vessel, buoy and boat navigation and attitude/heading measurement. Bore (drilling) industry applications include borehole measurement for oil and telecom industry. Robotics applications include navigation and dead-reckoning of (D)GPS information of mobile robots. Physical rehabilitation applications include gait monitoring for Functional Electro Stimulation (FES) products. Ergonomics applications include posture registration and load monitoring of workers in construction and assembly industry. Exercise and sports applications include monitoring of athletes' style and performance.

Virtual Reality and Augmented Reality applications include real-time body posture and viewing direction measurement for cave or head-mounted display. PC interface applications include 2D or 3D motion input device for PDAs or PCs, such as 3D computer mouse for CAD and animation designers, video gaming controllers & accessories, radio-controlled vehicle controllers, and sports training devices (e.g. golf, baseball, tennis). Another application involves video devices, such as video cameras, cell phones with video capture, etc. Jitter is a common problem in such devices. To counteract the jitter, it is necessary to know what exactly the jitter is at any given moment. The addition of a sensor of the present invention to such video devices allows the video device to know what is being done to it, so that it can electronically compensate for the jitter. In yet another application, devices that have video display screens can maintain a vertical orientation of the display, even while the display screen itself is being rotated.

Industrial products applications include automotive airbag activators, vibration sensors, equipment stabilization platforms, seismic sensors (e.g. mining, petroleum), motion capture systems, navigation systems (e.g. dead reckoning in lieu of GPS), and asset/location tracking systems (e.g. cell phone e911 mandate). Seismic applications also include determining a direction of seismic movement. Medical applications include patient monitoring systems, and ergonomic & kinesthetic data acquisition.

Military applications include robotic vehicles (e.g. DARPA Robotic Vehicle Challenge), Predator/Drone remote control, Intelligent Battlefield (e.g. friend-or-foe tracking systems), and ordinance ballistic simulation. It is also applicable to precise positioning of soldiers and machinery in the field and in the air, coordination and guidance of missiles and projectiles (including cases where the GPS signal is either intermittent, unreliable or not available), precise positioning of vehicles, airplanes, helicopters, marine and river transports.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of measuring acceleration comprising:
    suspending a non-magnetic inertial body using a magnetic fluid;
    generating a magnetic field within the magnetic fluid;
    modulating the magnetic field to counteract and minimize a displacement of the inertial body due to acceleration; and
    calculating the acceleration based on the modulation,
        wherein the change in the position of the inertial body is calculated based on changes of magnetic flux line distribution within the magnetic fluid.

2. The method of claim 1, wherein the calculating step derives the acceleration based on an amount of current required for the modulating using electromagnets.

3. The method of claim 1, wherein the acceleration includes linear acceleration.

4. The method of claim 1, wherein the acceleration includes angular acceleration.

5. The method of claim 1, further comprising driving current through a plurality of magnets for generating the magnetic field.

6. The method of claim 5, further comprising using sensing coils for detecting the displacement of the inertial body.

7. The method of claim 1, wherein the inertial body has a ferromagnetic coating on portions of its surface.

8. A method for measuring acceleration comprising:
    suspending a non-magnetic inertial body in a magnetic fluid;
    measuring behavior of the inertial body in response to acceleration;
    applying a force to the inertial body to counteract the acceleration and minimize a displacement of the inertial body; and calculating the acceleration as a function of the applied force,
wherein the displacement of the inertial body is calculated based on changes of magnetic flux line distribution within the magnetic fluid.

9. A method of measuring acceleration comprising:
suspending a non-magnetic object using a fluid;
generating a magnetic field within the fluid;
detecting a change in position of the object due to acceleration;
controlling the magnetic field to counteract and minimize the change in position of the object; and
calculating the acceleration as a function of the control of the magnetic field,
wherein the change in the position of the inertial body is calculated based on changes of magnetic flux line distribution within the magnetic fluid.

10. An A sensing element of an accelerometer comprising:
a non-magnetic inertial body;
a plurality of separate drops of magnetic fluid holding the inertial body in suspension;
a plurality of magnetic poles maintaining the drops in contact with the inertial body;
a controller that modulates magnetic fields generated by the magnetic poles to counteract and minimize a displacement of the inertial body due to acceleration;
a sensor that detects changes in the magnetic flux distribution due to the change in position of the inertial body,
wherein the change of the magnetic flux line distribution is indicative of the acceleration.

11. The sensing element of claim 10, wherein the controller derives the acceleration as a function of a current required by the magnetic poles to modulate the magnetic fields.

12. The sensing element of claim 10, wherein the acceleration comprises linear acceleration.

13. The sensing element of claim 10, wherein the acceleration comprises angular acceleration.

14. The sensing element of claim 10, wherein the angular acceleration comprises three components of angular acceleration.

15. The sensing element of claim 10, wherein the sensor fUrther comprises sensing coils for detecting the displacement of the inertial body.

16. The sensing element of claim 10, wherein the sensor further comprises Hall sensors for detecting the displacement of the inertial body.

17. The sensing element of claim 10, wherein the sensor further comprises acoustic sensors for detecting the displacement of the inertial body.

18. The sensing element of claim 10, further comprising a ferromagnetic coating on portions of the inertial body.

19. A sensing element of an accelerometer compnsing:
a non-magnetic inertial body;
a plurality of magnets located in proximity to the inertial body and on opposing sides of the inertial body;
a magnetic fluid between the magnets and the inertial body; and
a circuit that modulates magnetic fields generated by the magnets to counteract and minimize a displacement of the inertial body due to acceleration; and
a sensor that detects changes in the magnetic flux distribution due to the displacement of the inertial body,
wherein the change of the magnetic flux line distribution is indicative of the acceleration.

20. The sensing element of an accelerometer of claim 19, further comprising a second circuit that derives the acceleration based on an amount of current through the magnets required to counteract the displacement.

21. The sensing element of an accelerometer of claim 19, wherein the acceleration includes linear acceleration.

22. The sensing element of an accelerometer of claim 19, wherein the acceleration includes angular acceleration.

23. The sensing element of an accelerometer of claim 19, wherein the magnets further comprise permanent magnets.

24. The sensing element of an accelerometer of claim 19, further comprising sensing coils for detecting the displacement of the inertial body.

25. The sensing element of an accelerometer of claim 19, further comprising Hall sensors for detecting the displacement of the inertial body.

26. The sensing element of an accelerometer of claim 19, further comprising acoustic sensors for detecting displacement of the inertial body.

27. The sensing element of an accelerometer of claim 19, further comprising a ferromagnetic coating on portions of the inertial body.

28. The sensing element of an accelerometer of claim 19, further comprising:
a housing enclosing the inertial body and the magnetic fluid; and
a plurality of casings each having a magnet mounted therein, the casings being coupled to the housing and projecting into the housing.

29. A sensing element of an accelerometer comprising:
a non-magnetic inertial body;
a plurality of magnets generating a repulsive force acting on the inertial body;
a circuit that modulates magnetic fields generated by the magnets so as to counteract and minimize a displacement of the inertial body due to acceleration; and
a sensor that detects changes in the magnetic flux distribution due to the displacement of the inertial body,
wherein the change of the magnetic flux line distribution is indicative of the acceleration.

30. A sensor comprising:
a non-magnetic inertial body;
a magnetic fluid exerting a force on the inertial body;
a plurality of magnets generating magnetic fields within the magnetic fluid,
wherein a position of the inertial body relative to the magnets is maintained by modulation of the magnetic fields by minimizing a displacement of the inertial body;
a circuit that derives acceleration based on the modulation; and
a sensor that detects changes in the magnetic flux distribution due to the displacement of the inertial body,
wherein the change of the magnetic flux line distribution is indicative of the acceleration.

31. A sensor comprising:
a non-magnetic inertial body;
a fluid exerting a force on the inertial body;
a plurality of magnets generating magnetic fields within the fluid,
a position sensor detecting a change in position of the inertial body due to acceleration;
a controller that drives the magnets in response to the change so as to minimize the change in position of the inertial body; and
a sensor that detects changes in the magnetic flux distribution due to displacement of the inertial body,
wherein the change of the magnetic flux line distribution is indicative of acceleration of the sensor, and
wherein the acceleration is derived from current required by the magnets.

* * * * *